(12) United States Patent
Noguchi

(10) Patent No.: US 12,293,489 B2
(45) Date of Patent: May 6, 2025

(54) VIRTUAL IMAGE DISPLAY DEVICE

(71) Applicant: SEIKO EPSON CORPORATION, Tokyo (JP)

(72) Inventor: Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 185 days.

(21) Appl. No.: 18/161,435

(22) Filed: Jan. 30, 2023

(65) Prior Publication Data

US 2023/0245288 A1    Aug. 3, 2023

(30) Foreign Application Priority Data

Jan. 31, 2022 (JP) ................. 2022-012888

(51) Int. Cl.
G06T 5/00 (2024.01)
G02B 27/01 (2006.01)
G06T 5/50 (2006.01)
G06T 5/80 (2024.01)

(52) U.S. Cl.
CPC ............ *G06T 5/50* (2013.01); *G02B 27/0172* (2013.01); *G06T 5/80* (2024.01); *G02B 2027/011* (2013.01)

(58) Field of Classification Search
None
See application file for complete search history.

(56) References Cited

U.S. PATENT DOCUMENTS

| | | | | |
|---|---|---|---|---|
| 6,833,858 | B1* | 12/2004 | Ogino | H04N 23/64 |
| | | | | 348/46 |
| 2008/0055193 | A1* | 3/2008 | Tsuyuki | G02B 17/045 |
| | | | | 345/7 |
| 2010/0091027 | A1* | 4/2010 | Oyama | G02B 27/0101 |
| | | | | 345/581 |
| 2018/0270458 | A1* | 9/2018 | Ota | H04N 9/3185 |
| 2018/0376122 | A1* | 12/2018 | Park | H04N 13/296 |
| 2021/0166361 | A1* | 6/2021 | Fukushi | H04N 23/95 |
| 2021/0287384 | A1* | 9/2021 | Son | G06T 3/18 |
| 2021/0329223 | A1* | 10/2021 | Himukashi | G06F 3/016 |
| 2021/0400193 | A1* | 12/2021 | Ma | H04N 5/2624 |
| 2022/0232166 | A1* | 7/2022 | Eguchi | H04N 23/67 |
| 2022/0335579 | A1* | 10/2022 | Zhou | G06T 5/80 |

FOREIGN PATENT DOCUMENTS

JP    2008-058703 A    3/2008

* cited by examiner

*Primary Examiner* — Martin Mushambo
(74) *Attorney, Agent, or Firm* — Oliff PLC

(57) ABSTRACT

A virtual image display device includes a first acquisition unit configured to acquire a first image from an information terminal, a second acquisition unit configured to acquire a second image different from the first image, a correction unit configured to distort the first image, a generation unit configured to generate a third image or a fourth image including the distorted first image and the second image, and a display element configured to display the third image or the fourth image.

7 Claims, 12 Drawing Sheets

VIRTUAL IMAGE DISPLAY DEVICE

The present application is based on, and claims priority from JP Application Serial Number 2022-012888, filed Jan. 31, 2022, the disclosure of which is hereby incorporated by reference herein in its entirety.

BACKGROUND

1. Technical Field

The present disclosure relates to a virtual image display device that enables observation of a virtual image.

2. Related Art

An image display device is disclosed in which distortion correction, in which distortion in a direction opposite to distortion caused by an optical system for observing an image displayed on an image display element is applied, is performed as data processing to an input image displayed on the image display element, and the image subjected to the distortion processing is displayed on the image display element (JP-A-2008-058703).

In the device disclosed in JP-A-2008-058703, a contour shape of the distortion-corrected image displayed on the image display element is different from a contour shape of a display surface of the image display element, and thus there is a region not used for image display on the display surface. Such a region not used for display is wasted even though the region is a region displayable on the projected image.

SUMMARY

A virtual image display device according to one aspect of the present disclosure includes a first acquisition unit configured to acquire a first image from an information terminal, a second acquisition unit configured to acquire a second image different from the first image, a correction unit configured to distort the first image, a generation unit configured to generate a third image including the distorted first image and the second image, and a display element configured to display the third image.

DESCRIPTION OF EXEMPLARY EMBODIMENTS

First Embodiment

Next, a virtual image display device according to a first embodiment of the present disclosure will be described with reference to FIGS. 1 to 3.

Figure 1:
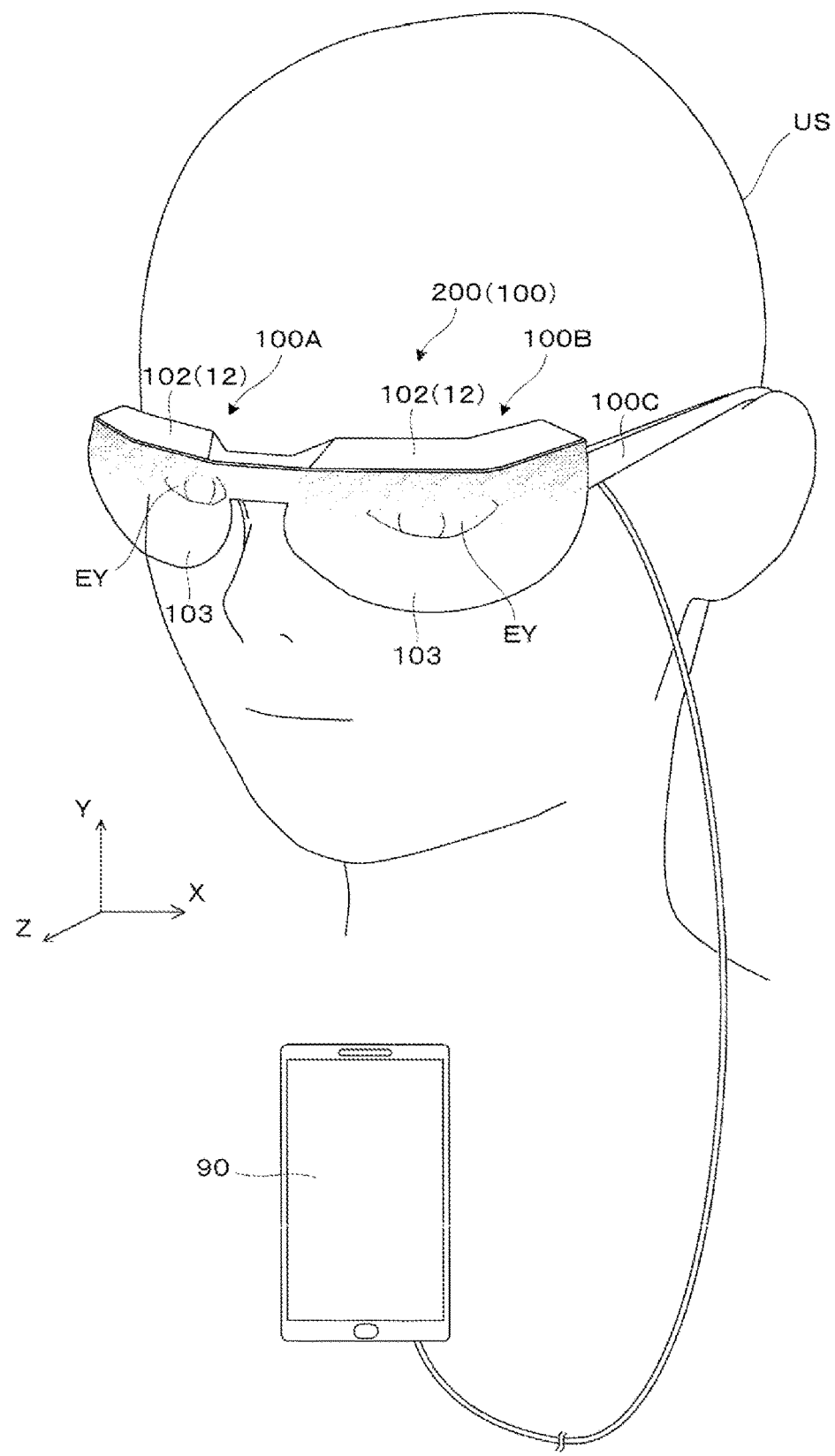
FIG. 1 is an external perspective view illustrating a mounted state of a virtual image display device according to a first embodiment.

FIG. 1 is a diagram illustrating a mounted state of a head-mounted display (hereinafter, also referred to as "HMD") 200. The HMD 200 allows an observer or wearer US wearing the HMD 200 to recognize an image as a virtual image. In FIG. 1 and the like, X, Y, and Z are an orthogonal coordinate system, a +X direction corresponds to a transverse direction in which two eyes EY of an observer or wearer US wearing the HMD 200 or a virtual image display device 100 are disposed, a +Y direction corresponds to an upward direction orthogonal to the transverse direction in which the two eyes EY of the wearer US are disposed, and a +Z direction corresponds to a direction to the front or a forward direction for the wearer US. A ±Y direction is parallel to a vertical axis or a vertical direction.

The HMD 200 includes a first display device 100A for the right eye, a second display device 100B for the left eye, a pair of temple type support devices 100C supporting the display devices 100A and 100B, and a user terminal 90 that is an information terminal. The first display device 100A includes a display drive unit 102 disposed at an upper portion thereof, and an exterior member 103 covering the front of the eye in the form of a spectacle lens. Similarly, the second display device 100B includes a display drive unit 102 disposed at an upper portion thereof, and an exterior member 103 covering the front of the eye in the form of a spectacle lens. The support devices 100C support the upper end side of the exterior member 103 via the display drive unit 102. The first display device 100A and the second display device 100B are optical inversions with left and right reversed, and thus a detailed description of the second display device 100B will be omitted.

Figure 2:
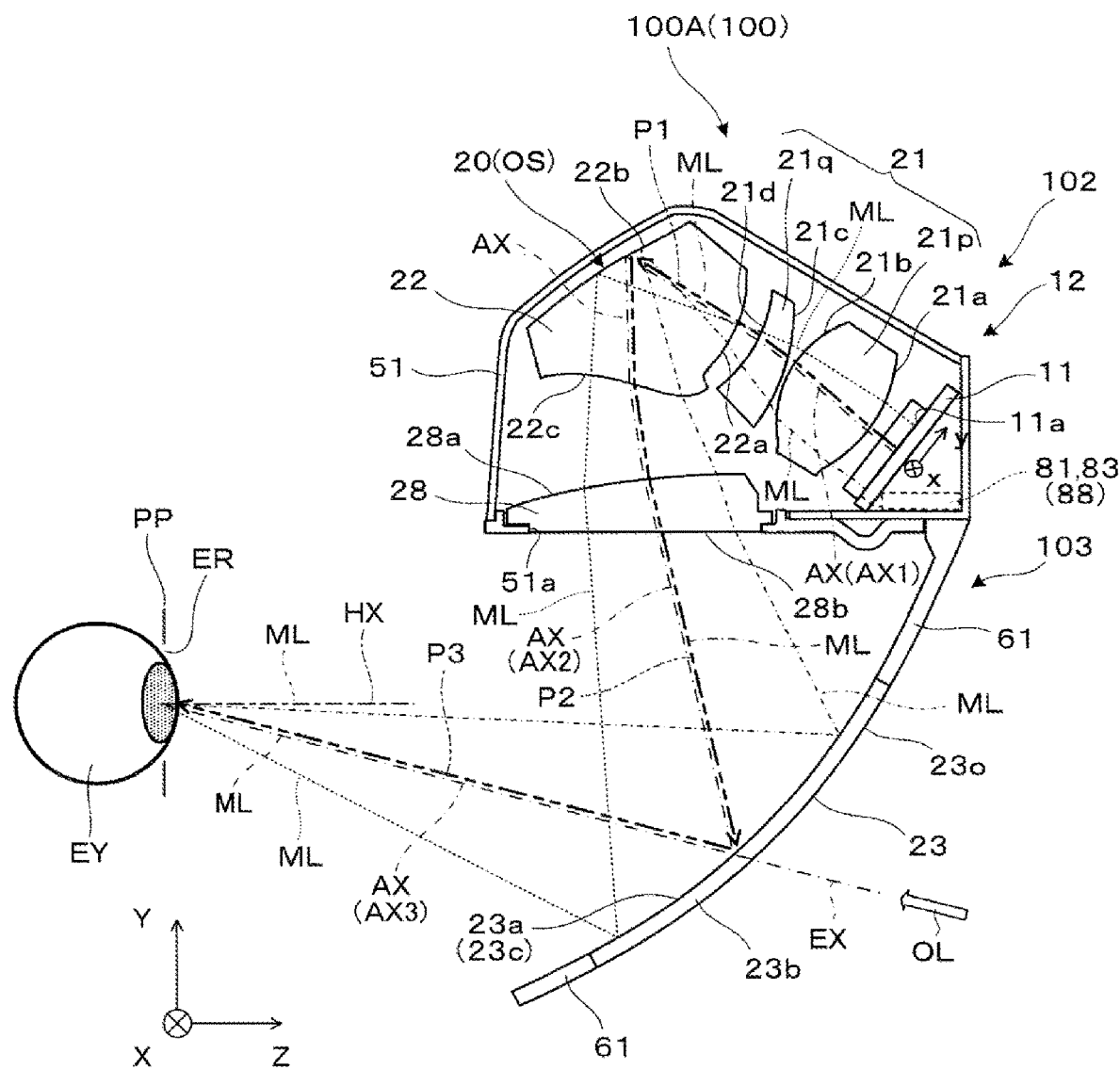
FIG. 2 is a side cross-sectional view illustrating an internal structure of the virtual image display device.

FIG. 2 is a side cross-sectional view illustrating an optical structure of the first display device 100A. The first display device 100A includes a display element 11, an imaging optical system 20, and a display control device 88. The imaging optical system 20 includes a projection lens 21, a prism mirror 22, a wedge-shaped optical element 28, and a see-through mirror 23. In the imaging optical system 20, the projection lens 21, the prism mirror 22, and the wedge-shaped optical element 28 correspond to an optical member on which image light ML corresponding to a composite image of a third image or a fourth image to be described later is incident, and the see-through mirror 23 corresponds to a reflection member that reflects the image light ML emitted from the optical member toward the eye EY or a pupil position PP. Additionally, in the imaging optical system 20, the projection lens 21, the prism mirror 22, and the wedge-shaped optical element 28 correspond to the display drive unit 102 illustrated in FIG. 1, and the see-through mirror 23 corresponds to the exterior member 103 illustrated in FIG. 1. A combination of the display element 11, the projection lens 21, the prism mirror 22, and the wedge-shaped optical element 28 is referred to as a projection optical system 12. The display element 11, the projection lens 21, the prism mirror 22, and the wedge-shaped optical element 28 are fixed in a case 51 while being aligned with each other. The case 51 is formed of a light-blocking material and supports the display control device 88 that operates the display element 11. The case 51 includes an opening 51a, and the wedge-shaped optical element 28 is fitted and fixed around the opening 51a. The opening 51a enables the projection optical system 12 to emit the image light ML toward the outside.

The display element 11 is a spontaneous light emission type display device. The display element 11 is, for example, an organic electroluminescence (EL) display, and forms a color still image or moving image on a two-dimensional display surface 11a. The display element 11 is disposed along an x-y plane that is inclined relative to an X-Y plane by being slightly rotated about an X axis. The display element 11 is driven by the display control device 88 to perform a display operation.

The display element 11 is not limited to the organic EL display, and can be replaced with a display device that uses inorganic EL, an organic LED, an LED array, a laser array, a quantum dot light emission element, or the like. The display element 11 is not limited to a spontaneous light emission type image light generation device, and may be an article that includes an LCD and another light modulation element and forms an image by illuminating the light modulation element with a light source such as a backlight. As the display element 11, a liquid crystal on silicon (LCOS) (LCoS is a trade name), a digital micro-mirror device, or the like may be used instead of an LCD.

In the imaging optical system 20, the projection lens 21 includes a first lens 21p and a second lens 21q. The first lens 21p includes an incident surface 21a and an emission surface 21b, and the second lens 21q includes an incident surface 21c and an emission surface 21d. The projection lens 21 receives the image light ML emitted from the display element 11 and causes the image light ML to be incident on the prism mirror 22. The projection lens 21 focuses the image light ML emitted from the display element 11 into a state close to a parallel luminous flux. The prism mirror 22 includes an incident surface 22a, an inner reflection surface 22b, and an emission surface 22c. The prism mirror 22 emits the image light ML incident from the front so as to return the image light ML in a direction inclined relative to a direction reverse to an incident direction (a direction of the light source when seen from the prism mirror 22). The wedge-shaped optical element 28 includes a first surface 28a and a second surface 28b, and allows the image light ML emitted from the prism mirror 22 and directed toward the see-through mirror 23 to pass therethrough. The see-through mirror 23 includes a reflection surface 23a and an outer surface 23o. The see-through mirror 23 magnifies an intermediate image formed on the light emission side of the prism mirror 22.

The imaging optical system 20 is an off-axis optical system OS due to the see-through mirror 23 being a concave mirror. In the case of the present embodiment, the projection lens 21, the prism mirror 22, and the see-through mirror 23 are non-axisymmetrically disposed and have optical surfaces that are non-axisymmetric. The fact that the imaging optical system 20 is the off-axis optical system OS means that the optical path as a whole is bent before and after light rays are incident on a plurality of reflection surfaces or refraction surfaces in the optical elements 21, 22, 28, and 23 constituting the imaging optical system 20. In such an imaging optical system 20, that is, the off-axis optical system OS, an optical axis AX is bent so that the optical axis AX extends along an off-axis surface (a surface parallel to a Y-Z plane) corresponding to a plane of the drawing. In the imaging optical system 20, the optical elements 21, 22, 28, and 23 are arranged along the off-axis surface by the optical axis AX being bent in the off-axis surface parallel to the Y-Z plane. The optical axis AX of the imaging optical system 20 includes optical axis portions AX1, AX2, and AX3 that are disposed along the off-axis surface (the surface parallel to the Y-Z plane), which is a reference surface extending in a longitudinal direction, and that are inclined relative to each other before and after the reflection surface. The optical axis AX as a whole extends along an optical path of main rays emitted from the center of the display element 11 and passes through the center of the eye ring ER or the pupil corresponding to an eye point. The optical axis AX is disposed in a Z shape by the plurality of optical axis portions AX1, AX2, and AX3 when seen in a transverse cross section parallel to the Y-Z plane. In other words, in the off-axis surface parallel to the Y-Z plane, an optical path P1 from the projection lens 21 to the inner reflection surface 22b, an optical path P2 from the inner reflection surface 22b to the see-through mirror 23, and an optical path P3 from the see-through mirror 23 to the pupil position PP are bent in a Z shape in two stages. The imaging optical system 20 is longitudinally arranged. Correspondingly, the off-axis surface (the surface parallel to the Y-Z plane) that is a reference surface extends parallel to the Y direction that is the longitudinal direction. In this case, the optical elements 21, 22, 28, and 23 constituting the first display device 100A are arranged at varied height positions in the longitudinal direction, and thus an increase in a transverse width of the first display device 100A can be prevented.

In the imaging optical system 20, the optical path P1 from the projection lens 21 to the inner reflection surface 22b extends in an obliquely upward direction toward the rear. In other words, in the optical path P1, the optical axis portion AX1 extends in a direction close to the middle between the −Z direction and the +Y direction. The optical path P2 from the inner reflection surface 22b to the see-through mirror 23 extends obliquely downward toward the front. In other words, in the optical path P2, the optical axis portion AX2 extends in a direction close to the middle between the +Z direction and the −Y direction. However, when a horizontal surface direction (an X-Z plane) is used as a reference, the inclination of the optical path P2 is larger than that of the optical path P1. The optical path P3 from the see-through mirror 23 to the pupil position PP is close to parallel to the Z direction, but in the illustrated example, the optical axis portion AX3 is angled at approximately −10° relative to the +Z direction with the downward direction being negative. In other words, an emission optical axis EX that is an extension of the optical axis portion AX3 extends inclined downward by approximately 10° relative to a central axis HX that is parallel to the +Z direction to the front. This is because the line of sight of a human being is stable in a slightly downcast state in which the line of sight is inclined downward by approximately 10° relative to a horizontal direction. Note that the central axis HX extending in the horizontal direction relative to the pupil position PP assumes a case in which the wearer US wearing the first display device 100A is relaxed in an upright posture, faces the front, and gazes in a horizontal direction or a horizontal line.

The incident surface 21a and the emission surface 21b of the first lens 21p constituting the projection lens 21 have asymmetry relative to the longitudinal direction parallel to the Y-Z plane and intersecting the optical axis AX with the optical axis AX interposed therebetween, and have symmetry relative to the transverse direction or the X direction with the optical axis AX interposed therebetween. The incident surface 21c and the emission surface 21d of the second lens 21q constituting the projection lens 21 have asymmetry relative to the longitudinal direction parallel to the Y-Z plane and intersecting the optical axis AX with the optical axis AX interposed therebetween, and have symmetry relative to the transverse direction or the X direction with the optical axis AX interposed therebetween. The first lens 21p and the second lens 21q are formed of resin, for example, but can also be made of glass. The incident surface 21a and the emission surface 21b of the first lens 21p are freely-curved surfaces, for example. The incident surface 21a and the emission surface 21b are not limited to freely-curved surfaces, and may be aspherical surfaces. The incident surface 21c and the emission surface 21d of the second lens 21q are freely-curved surfaces, for example. The incident surface 21c and the emission surface 21d are not limited to freely-curved surfaces, and may be aspherical surfaces. Aberration reduction can be achieved by configuring the incident surface 21a and 21c and the emission surface 21b and 21d as freely-curved surfaces or aspherical surfaces. In particular, when a freely-curved surface is used, optical performance of an eccentric system is easily improved, and thus the aberration of the imaging optical system 20 that is an non-coaxial off-axis optical system OS can be easily reduced. Although detailed illustration is omitted, an antireflection film is formed on the incident surfaces 21a and 21c and the emission surfaces 21b and 21d.

The prism mirror 22 is a refractive reflection optical member having a function of combining a mirror and a lens, and reflects the image light ML from the projection lens 21 while refracting it. The prism mirror 22 is a first reflecting optical member, and causes the image light ML to be incident on an inner portion thereof via the incident surface 22a, totally reflects the incident image light ML in a non-front direction by the inner reflection surface 22b, and causes the incident image light ML to be emitted to the outside via the emission surface 22c. The light incident surface 22a and the light emission surface 22c are optical surfaces formed of curved surfaces, and contribute to resolution improvement compared to a case in which the light incident surface 22a and the light emission surface 22c are only formed of reflection surfaces or a case in which the light incident surface 22a and the light emission surface 22c are flat surfaces. The incident surface 22a, the inner reflection surface 22b, and the light emission surface 22c that are the optical surfaces constituting the prism mirror 22 have asymmetry relative to the longitudinal direction parallel to the Y-Z plane and intersecting the optical axis AX with the optical axis AX interposed therebetween, and have symmetry relative to the transverse direction or the X direction with the optical axis AX interposed therebetween. The prism mirror 22 is formed of resin, for example, but can also be made of glass. A refractive index of a main body of the prism mirror 22 is set to a value such that total reflection on the inner surface is achieved in consideration of a reflection angle of the image light ML. The optical surfaces of the prism mirror 22, that is, the incident surface 22a, the inner reflection surface 22b, and the emission surface 22c are, for example, freely-curved surfaces. The incident surface 22a, the inner reflection surface 22b, and the emission surface 22c are not limited to freely-curved surfaces, and may be aspherical surfaces. In the prism mirror 22, aberration reduction can be achieved by configuring the optical surfaces 22a, 22b, and 22c as freely-curved surfaces or aspherical surfaces. In particular, when a freely-curved surface is used, the optical performance of the eccentric system is easily improved. The inner reflection surface 22b is not limited to one that reflects the image light ML by total reflection, and may be a reflection surface formed of a metal film or a dielectric multilayer film. In this case, a reflection film formed of a single layer film or multilayer film formed of a metal such as Al or Ag is formed on the inner reflection surface 22b by vapor deposition or the like, or a sheet-shaped reflection film formed of a metal is affixed thereto. Although detailed illustration is omitted, an antireflection film is formed on the incident surface 22a and the emission surface 22c.

The wedge-shaped optical element 28 is disposed between the prism mirror 22 and the see-through mirror 23 and has light-transmissive properties. The wedge-shaped optical element 28 has a role of improving the imaging state. The first surface 28a provided on the incident side of the wedge-shaped optical element 28 is flat but is a free-curved surface, and has asymmetry relative to the longitudinal direction parallel to the Y-Z plane with the optical axis AX interposed therebetween and has symmetry relative to the X direction that is perpendicular to the Y-Z plane, that is, relative to the transverse direction with the optical axis AX interposed therebetween. An antireflection film is formed on the first surface 28a. The second surface 28b provided on the emission side of the wedge-shaped optical element 28 is a flat surface, and an antireflection film is formed thereon. The wedge-shaped optical element 28 is thicker on the +Z side that is the front side. Thus, it is possible to curb the occurrence of distortion aberration caused by the prism mirror 22 or the like. The refractive index of the wedge-shaped optical element 28 is different from that of the prism mirror 22. Thus, it is possible to adjust the degree of refraction or dispersion between the wedge-shaped optical element 28 and the prism mirror 22, and thus, achromatization is easily achieved.

The see-through mirror 23 is a curved plate-shaped optical member that serves as a concave surface mirror, and reflects the image light ML from the prism mirror 22. In other words, the see-through mirror 23 reflects the image light ML from the wedge-shaped optical element 28 disposed in an emission region of the projection optical system 12 toward the pupil position PP. The see-through mirror 23 covers the pupil position PP at which the eye EY or the pupil is disposed, has a concave shape toward the pupil position PP, and has a convex shape toward the outside. The see-through mirror 23 is a concave transmission mirror covering the entire effective region of a screen in the view. The see-through mirror 23 is a collimator having a convergence function, and converges the main rays of the image light ML, which are the main rays of the image light ML emitted from each point on the display surface 11a and has spread due to image formation in the vicinity of the emission side of the wedge-shaped optical element 28 of the projection optical system 12, to the pupil position PP. The see-through mirror 23 is a mirror plate having a structure in which a mirror film 23c having light-transmissive properties is formed on a front surface or a back surface of a plate-shaped body 23b. The reflection surface 23a of the see-through mirror 23 has asymmetry relative to the longitudinal direction parallel to the Y-Z plane and intersecting the optical axis AX with the optical axis AX interposed therebetween, and has symmetry relative to the transverse direction or the X direction with the optical axis AX interposed therebetween. The reflection surface 23a of the see-through mirror 23 is, for example, a freely-curved surface. The reflection surface 23a is not limited to a freely-curved surface, and may be an aspherical surface. Aberration reduction can be achieved by configuring the see-through mirror 23 as a freely-curved surface or an aspherical surface. In particular, when a freely-curved surface is used, the aberration of the imaging optical system 20 that is an off-axis optical system OS or a non-coaxial optical system can be easily reduced.

The see-through mirror 23 is a transmissive type reflection element that allows transmission of part of light upon reflection. The reflection surface 23a or the mirror film 23c of the see-through mirror 23 is formed by a reflection layer having semi-transmissive properties. Thus, because outside light OL passes through the see-through mirror 23, see-through view of the outside is enabled, and a virtual image can be superimposed on an outside image. At this time, when the plate-shaped body 23b supporting the mirror film 23c has a thickness of approximately a few millimeters or less, a change in magnification of the outside image can be curbed to a low level. A reflectance of the mirror film 23c relative to the image light ML and the outside light OL is set to 10% or more and 50% or less in a range of an incident angle of the assumed image light ML from the viewpoint of ensuring a brightness of the image light ML and facilitating observation of the outside image by see-through. The plate-shaped body 23b that is a base material of the see-through mirror 23 is formed of resin, for example, but can also be made of glass. The plate-shaped body 23b is formed of the same material as that of the support plate 61 supporting the plate-shaped body 23b from the surrounding thereof, and has the same thickness as that of the support plate 61. The mirror film 23c is formed of, for example, a dielectric multilayer film including a plurality of dielectric layers having an adjusted film thickness. The mirror film 23c may be a single-layer film or a multilayer film of a metal such as Al or Ag of which a film thickness has been adjusted. The mirror film 23c may be formed by laminating, and may also be formed by affixing a sheet-shaped reflection film. An antireflection film is formed on an outer surface 23o of the plate-shaped body 23b.

Referring to the optical path, the image light ML from the display element 11 is incident on the projection lens 21 and is emitted from the projection lens 21 in a substantially collimated state. The image light ML that has passed through the projection lens 21 is incident on the prism mirror 22, passes through the incident surface 22a while being refracted, is reflected by the inner reflection surface 22b with a high reflectance close to 100%, and is refracted again by the emission surface 22c. The image light ML from the prism mirror 22 is incident on the see-through mirror 23 via the wedge-shaped optical element 28 and is reflected by the reflection surface 23a with a reflectance of about 50% or less. The image light ML reflected by the see-through mirror 23 is incident on the pupil position PP at which the eye EY or pupil of the wearer US is placed. The outside light OL that has passed through the see-through mirror 23 and the support plate 61 therearound is also incident on the pupil position PP. In other words, the wearer US wearing the first display device 100A can observe a virtual image of the image light ML in a state of being superimposed on the outside image.

Figure 3:
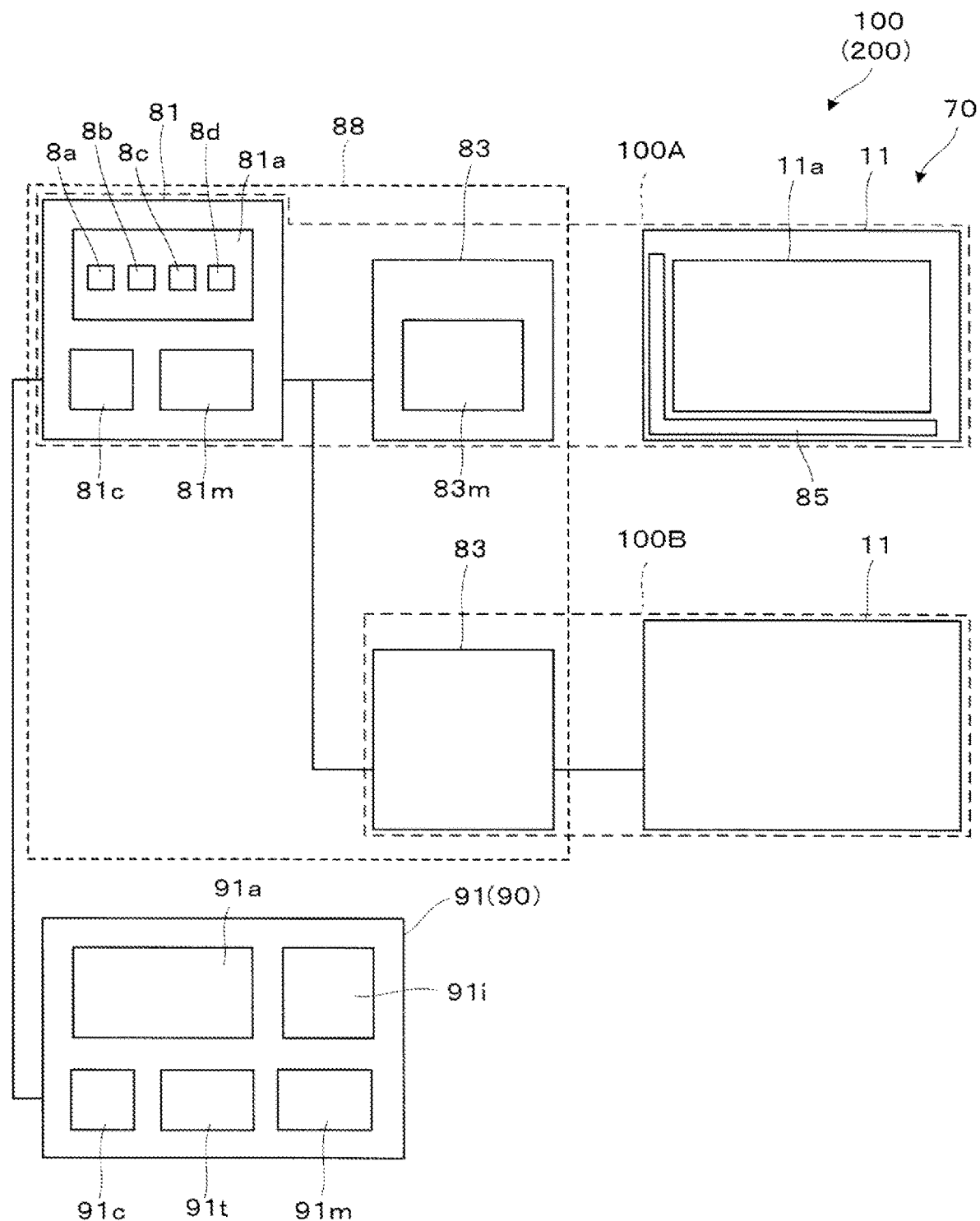
FIG. 3 is a block diagram illustrating a circuit configuration of the virtual image display device.

Referring to FIG. 3, a circuit system 70 of the HMD 200 or the virtual image display device 100 will be described. The HMD 200 includes a microprocessor 81, a pair of display controllers 83, a pair of display elements 11 and a user terminal circuit 91 as the circuit system 70. One display element 11 and one display controller 83 are incorporated in the first display device 100A, and the other display element 11 and the other display controller 83 are incorporated in the second display device 100B. In the illustrated example, the microprocessor 81 is represented as being incorporated in the first display device 100A, but may be independent of the first display device 100A and the second display device 100B. Note that a combination of the first display device 100A or the second display device 100B and the microprocessor 81 is also referred to as a virtual image display device 100, and a virtual image for one eye is displayed.

Microprocessor 81 outputs image data to the pair of display controllers 83. In the display controllers 83, the image data input from the microprocessor 81 is stored in the memory 83m to output the image data to the display element 11. The image data output from the microprocessor 81 to the pair of display controllers 83 may be the same or different. Hereinafter, processing in one first display device 100A will be described.

The display controller 83 includes the memory 83m and the like, and causes the display element 11 to perform a display operation. The display element 11 includes an auxiliary circuit 85 including a scanning driver and a data driver around the display surface 11a. In displaying each frame image, the display controller 83 outputs a data signal corresponding to the image data stored in the memory 83m to the auxiliary circuit 85 in scanning line units along with a timing signal or the like, and the auxiliary circuit 85 rewrites the display state of the display surface 11a in response to the data signal or the like input from the display controller 83.

The microprocessor 81 may be a microcomputer, and includes an arithmetic processing device 81a, a storage device 81m, and a data communication interface 81c.

The storage device 81m stores a program that causes the first display device 100A and the second display device 100B to perform the display operation. Additionally, the storage device 81m also stores images obtained from a user terminal 90 that is an information terminal, and images generated by the microprocessor 81 or the arithmetic processing device 81a.

The microprocessor 81 receives display data corresponding to the image data from a user terminal circuit 91 via the data communication interface 81c. The microprocessor 81 performs distortion correction processing on the display data or the image data acquired from the user terminal circuit 91, and synthesizes additional image data for information display into the outside of the display region of the display data after the distortion correction processing. The microprocessor 81 outputs, via the data communication interface 81c, the image data that is the display data after the processing to the display controller 83.

The imaging optical system 20 illustrated in FIG. 2 is the off-axis optical system OS and has distortion aberration, that is, distortion as will be described later. To compensate for the distortion, a distortion-corrected image with a non-rectangular contour should be formed on the display surface 11a. The microprocessor 81 performs various image processing including arithmetic processing for a distortion correction or a distortion correction so that a rectangular contour image corresponding to the input signal from the user terminal circuit 91 illustrated in FIG. 3 becomes a non-rectangular contour image to be displayed on the display surface 11*a*.

The arithmetic processing device 81*a* functions as a first acquisition unit 8*a*, a second acquisition unit 8*b*, a correction unit 8*c*, and a generation unit 8*d* in order to display a virtual image of additional information using a peripheral margin of the display surface 11*a* while displaying a distortion-corrected virtual image using a central main region of the display surface 11*a*.

The first acquisition unit 8*a* acquires a first image from the user terminal 90 and stores the first image in the storage device 81*m*. The first image is a main display image to be displayed on the virtual image display device 100. Specifically, the first image is an initial image IM0 illustrated in FIG. 5 to be described later. The second acquisition unit 8*b* acquires a second image acquired from the user terminal 90 or a second image generated by the microprocessor 81 or the arithmetic processing device 81*a*, and stores the second image in the storage device 81*m*. The second image is an image different from the first image. Specifically, the second image is an additional image IM2 illustrated in FIG. 5 to be described later.

The correction unit 8*c* performs, as the image processing, correction processing for distorting the initial image IM0 that is the first image, and stores a distorted corrected image IM1 (hereinafter, also referred to as the distorted initial image IM0) illustrated in FIG. 5 in the storage device 81*m*. The correction unit 8*c* corrects the initial image IM0 by distorting the initial image IM0 such that the distortion generated by the imaging optical system 20 and the like illustrated in FIG. 2 is reversed. In other words, the correction unit 8*c* corrects the initial image IM0 to offset the distortion of the optical system. Additionally, the correction unit 8*c* performs correction processing for distorting the additional image IM2 that is the second image, and stores the distorted additional image IM2 in the storage device 81*m*.

The generation unit 8*d* generates a composite image IM3, which is a third image or a fourth image including the distorted initial image IM0 and additional image IM2, and stores the composite image IM3 in the storage device 81*m*. Note that in particular, in the present embodiment, the composite image IM3 including the distorted initial image IM0 and the distorted additional image IM2 is the fourth image. The display accuracy of the additional image IM2 that is the second image can be maintained by generating the fourth image, and thus image quality of the entire fourth image can be improved.

The user terminal circuit 91 is incorporated into the user terminal 90, and includes a main control device 91*a*, a storage device 91*m*, a data communication interface 91*c*, a mobile wireless communication device 91*t*, and a user interface device 91*i*. The user terminal circuit 91 can communicate with various devices such as an external server via a communication network (not illustrated) by the mobile wireless communication device 91*t*. The storage device 91*m* stores a basic program that operates the user terminal circuit 91, and as application software that is operated on the basic program, a plurality of application software including, for example, a viewer for reproducing moving images, a web browser, and the like are stored therein. The user terminal circuit 91 operates in response to a request from a user interface device 91*i* operated by the user, and outputs a moving image or a still image stored in the storage device 91*m* in association with the application software to the microprocessor 81 in a predetermined format, or acquires a moving image and a still image corresponding to various contents via the mobile wireless communication device 91*t*, and outputs the acquired display data to the microprocessor 81 in a predetermined format. In the above description, the microprocessor 81 performs distortion correction processing on the display data input from the user terminal circuit 91. However, the user terminal circuit 91 may perform the distortion correction processing on the display data, or may synthesize additional image data into the display data after the distortion correction processing.

Figure 4:
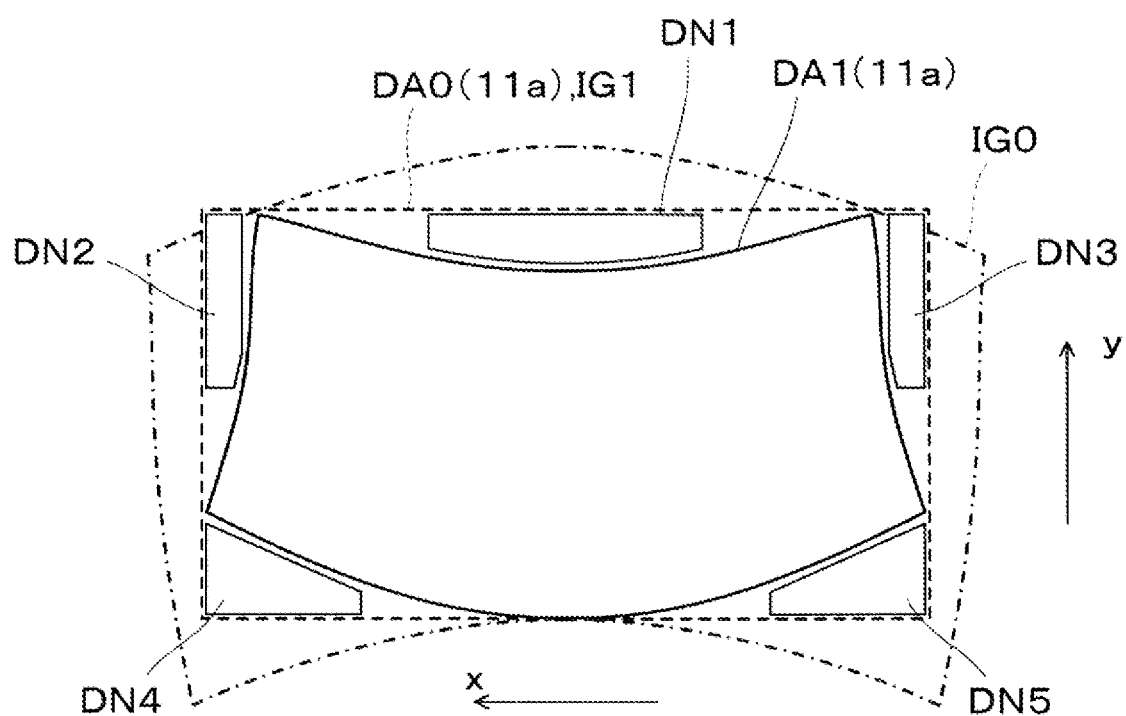
FIG. 4 is a conceptual diagram illustrating a distortion correction of a display image.

As illustrated in FIG. 4, in the first display device 100A illustrated in FIG. 2, since the imaging optical system 20 is an off-axis optical system OS, when a display image DA0 having a rectangular contour is projected, a distorted image IG0 with a non-rectangular contour having distortion aberration, that is, distortion is displayed on the display surface 11*a* of the display element 11. Here, it is not easy to eliminate distortion such as trapezoidal distortion of the distorted image IG0 by the imaging optical system 20 itself. Accordingly, in order to compensate for the distortion, the display image formed on the display surface 11*a* of the display element 11 is a corrected display image DA1 to which distortion such as trapezoidal distortion has been applied in advance. In this way, by causing the image displayed on the display element 11 to have reverse distortion that offsets the distortion formed by the projection lens 21, the prism mirror 22, the wedge-shaped optical element 28, and the see-through mirror 23, the pixel arrangement of the projected image IG1 of the virtual image observed at the pupil position PP through the imaging optical system 20 can have a grid pattern corresponding to the original display image DA0, and thus the contour of the projected image IG1 can be made rectangular. In other words, the corrected display image DA1 displayed on the display element 11 corrects the distortion formed by the projection lens 21, the prism mirror 22, the wedge-shaped optical element 28, and the see-through mirror 23. As a result, aberration as a whole including the display element 11 can be curbed while the distortion generated by the see-through mirror 23 and the like is allowed. Thus, the degree of freedom in the arrangement and size of the optical elements such as the prism mirror 22 is increased, and it is possible to easily secure the optical performance of the first display device 100A while miniaturization of the first display device 100A is achieved.

Since the corrected display image DA1 is displayed on the display surface 11*a* of the display element 11 instead of the original display image DA0, the auxiliary regions DN1 to DN5 not used for image display or image display are generated outside the corrected display image DA1. In the illustrated example, the first auxiliary region DN1 is present near the center of one end portion of the display surface 11*a* in the +y direction, the second and third auxiliary regions DN2 and DN3 are present near both ends of one end portion in the +y direction, and the fourth and fifth auxiliary regions DN4 and DN5 are present near both ends of the other end portion in the −y direction. Although details will be described later, the first to fifth auxiliary regions DN1 to DN5 not used for image display are used for information display. Thus, the display region that is unused can be effectively utilized, and a proportion of the region not used in the display element 11 can be reduced. As a result, an amount of information presented to the wearer US can be increased.

Figure 5:
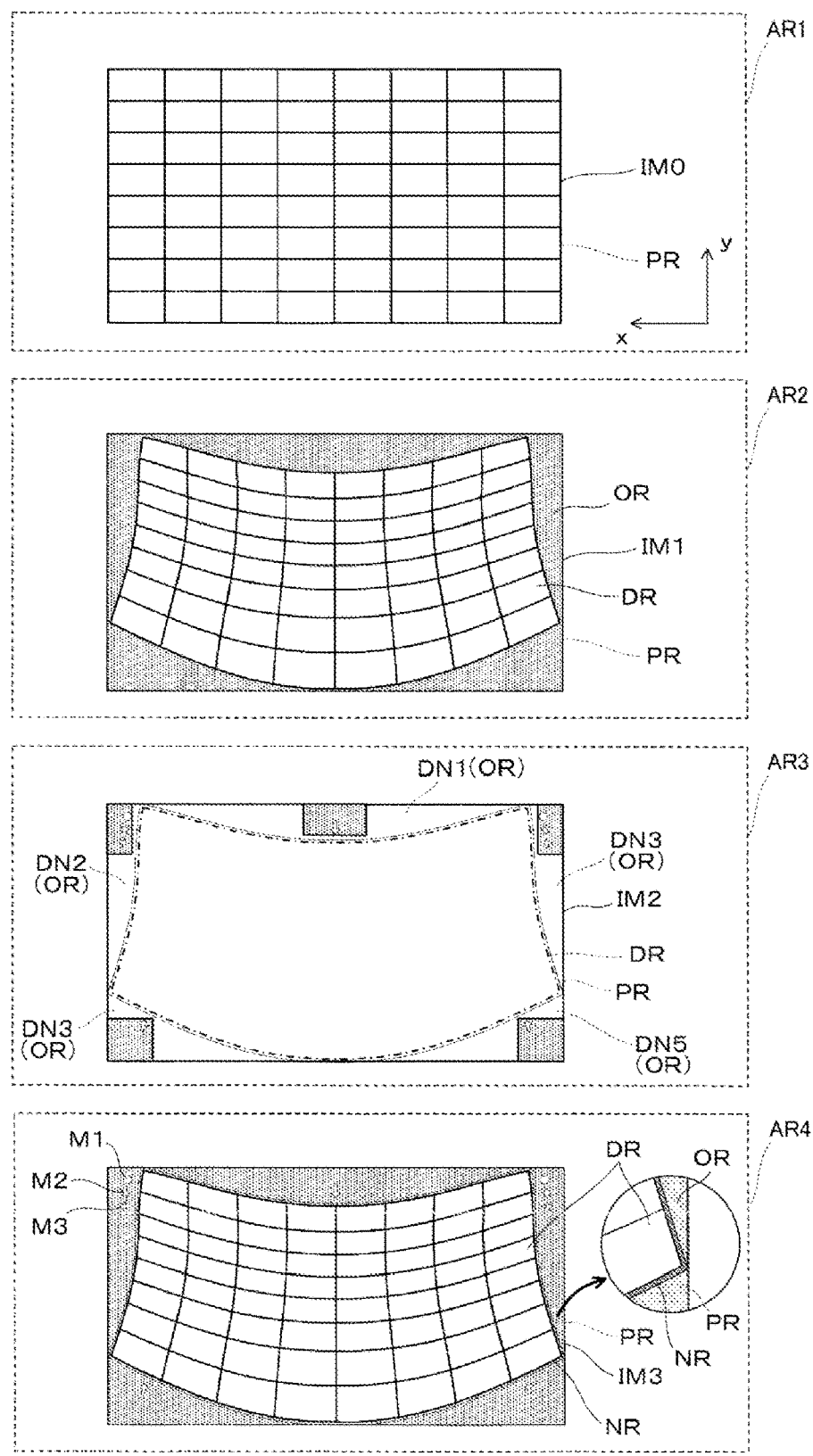
FIG. 5 is a conceptual diagram illustrating an image and a display image used for image processing in the virtual image display device.

FIG. 5 is a diagram illustrating an image used for image processing in the virtual image display device 100 and an image displayed on the display surface 11*a* of the display element 11. In FIG. 5, a region AR1 indicates the initial image IM0, a region AR2 indicates the corrected image IM1, and a region AR3 indicates the additional image IM2, and a region AR4 indicates the composite image IM3.

The initial image IM0 is the original display image before the distortion correction and corresponds to the display image DA0 having a rectangular contour illustrated in FIG. 4. The initial image IM0 corresponds to the first image.

The corrected image IM1 is a display image after the distortion correction and corresponds to the corrected display image DA1 having a non-rectangular contour illustrated in FIG. 4. Note that in the corrected image IM1, the contour of the corrected display image DA1 coincides with a contour of an image display region DR. The corrected image IM1 corresponds to the distorted first image. The corrected image IM1 is an image that corrects distortion generated in the optical system to be rectangular in a virtual image formed on the eye EY side. In the corrected image IM1, a part of an initial region PR in which the initial image IM0 is displayed by the distortion correction becomes a region not used for image display, that is, an outer frame region OR. Therefore, a part of the outer frame region OR, that is, the auxiliary regions DN1 to DN5, is used as an information display by the additional image IM2 described below. Note that since the shape of distortion differs depending on the optical system, the shape of distortion correction and the region not used for image display are not limited to the illustrated shapes.

The additional image IM2 is an image including information about the user terminal 90 that is an information terminal or the virtual image display device 100. Thus, the additional image IM2 can display information associated with the initial image IM0 or independent of the initial image IM0. The additional image IM2 is a simple display image different from the initial image IM0 or the corrected image IM1. The additional image IM2 corresponds to the second image. The additional image IM2 can display, for example, information such as an operation status of a coupled device, a remaining battery level, indicators, and alerts in a pattern, a character, and the like. In the illustrated example, patterns such as circles M1, stars M2, and arrows M3 are used as the information display. The additional image IM2 is disposed in the auxiliary region DN1 to DN5 in the initial region PR. The additional image IM2 illustrated in FIG. 5 is an image distorted such that the distortion aberration of the imaging optical system 20 is inconspicuous. The additional image IM2 may be an image corresponding to a predetermined wavelength band, that is, a monochromatic image. The processing for generating the composite image IM3 can be simplified by displaying the additional image IM2 in a single color. Examples of the predetermined wavelength band include green, but the predetermined wavelength band may also be red, blue, or the like. The patterns and the like displayed in the additional image IM2 may be corrected in their entirety or in part. The correction of the additional image IM2 may not be as strict as that of the initial image IM0.

The composite image IM3 includes the corrected image IM1 that is the distorted first image and the additional image IM2 that is the distorted second image. The composite image IM3 corresponds to a third image or a fourth image. In the composite image IM3, the additional image IM2 is disposed on an outer side of the corrected image IM1. Thus, it is possible to effectively utilize a region not used in the initial image IM0 or the corrected image IM1 without interfering with the display of the initial image IM0 or the corrected image IM1. The composite image IM3 includes a non-display region NR between the corrected image IM1 and the additional image IM2. Thus, pixels corresponding to the corrected image IM1 are separated from pixels corresponding to the additional image IM2, and a boundary between the corrected image IM1 and the additional image IM2 can be clarified. The non-display region NR is a belt-shaped image surrounding the image display region DR, and makes the corrected image IM1 stand out against the additional image IM2. Note that the non-display region NR may be displayed in black, or may be displayed in such a color that the boundary between the corrected image IM1 and the additional image IM2 can be distinguished.

Figure 6:
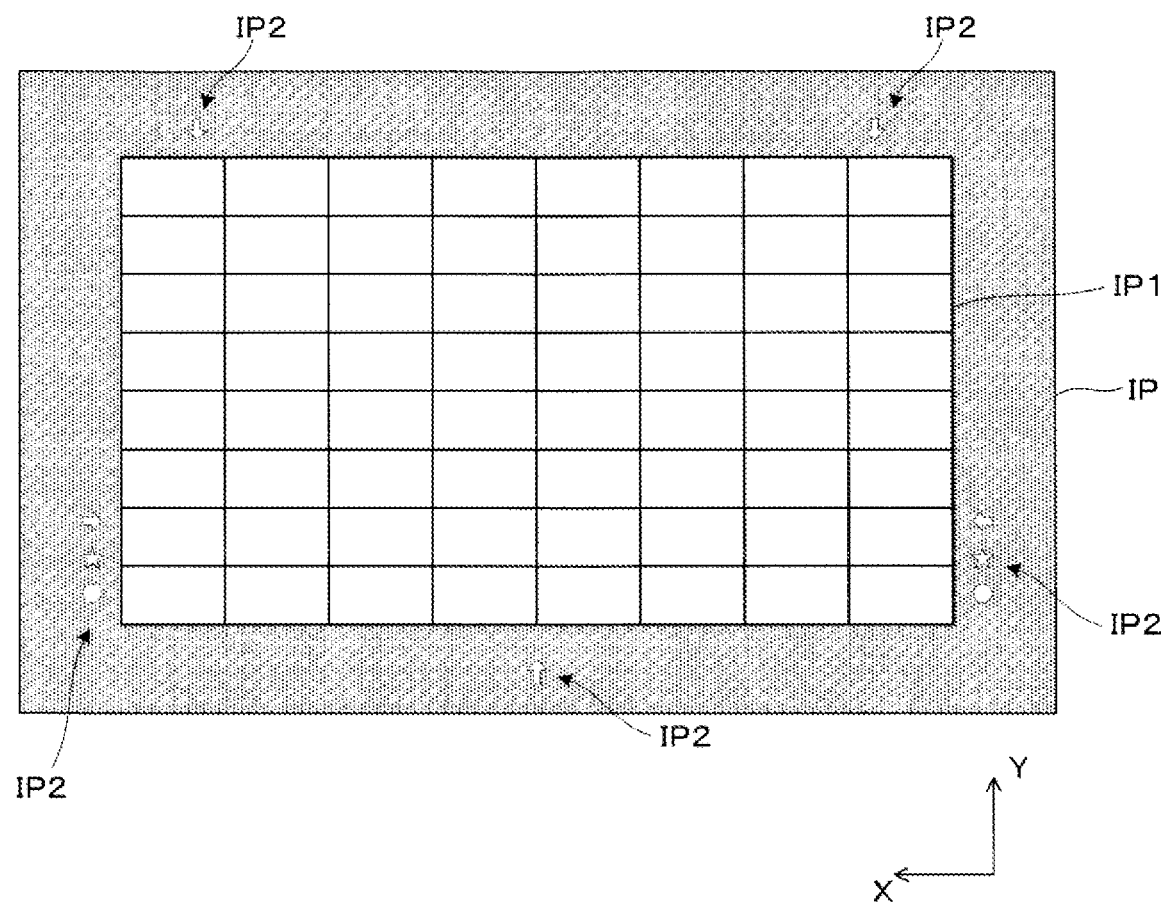
FIG. 6 is a conceptual diagram illustrating a virtual image projected by the virtual image display device.

As illustrated in FIG. 6, the virtual image IP of the composite image IM3 becomes an image in which the distortion is eliminated by correcting the initial image IM0 and the additional image IM2.

Figure 7:
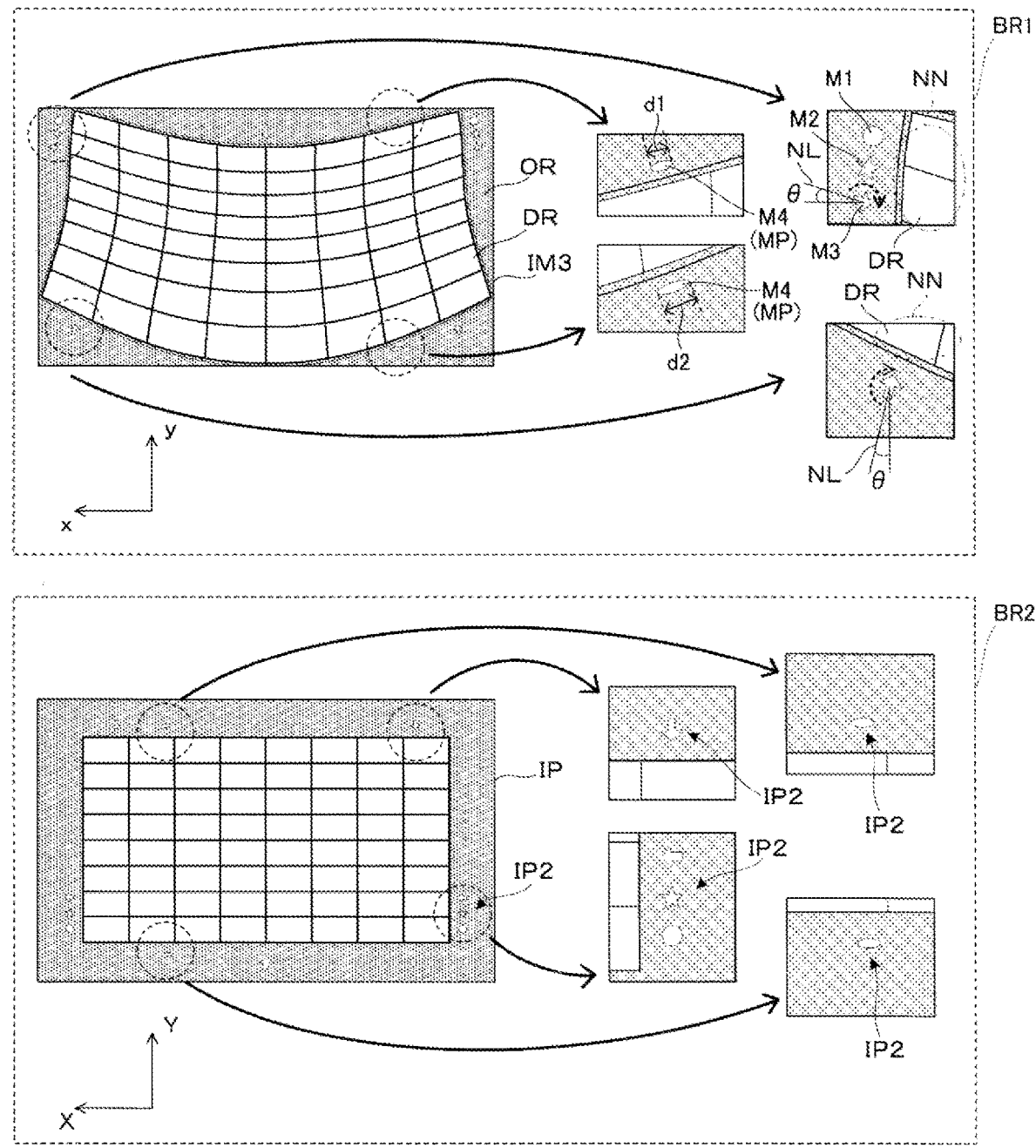
FIG. 7 is a conceptual diagram illustrating a display image of the virtual image display device and a virtual image corresponding to the display image.

FIG. 7 illustrates an example of the composite image IM3 and the virtual image IP when the additional image IM2 is corrected. In FIG. 7, a region BR1 indicates the composite image IM3, and a region BR2 indicates the virtual image IP. In the composite image IM3 of FIG. 7, the additional image IM2 illustrates an example in which an inclination of the pattern of the information display is adjusted so as to offset the distortion. Note that in the illustrated example, the shift adjustment of the pattern is also performed so as to offset the distortion, but only the inclination of the pattern may be adjusted. The virtual image IP of the composite image IM3 is displayed in a state in which the distortion of the pattern of the information display IP2 is substantially eliminated as a result of the correction of the additional image IM2. For example, in the case of a pattern such as an arrow M3, a correction is performed so that only an inclination is given and a direction of the virtual image IP is aligned. By inclining the pattern by an angle θ, the inclination in the observed virtual image IP is reduced, and thus a pattern close to the intended direction can be visually recognized. At this time, an inclination direction and an amount of inclination of an arrow M3 in the longitudinal direction may match a reference line NL with the inclination of a longitudinal line or a transverse line in the image display region DR of the corrected image IM1 in the vicinity NN as the reference line NL. This is basically because the distortion generated in the optical system becomes closer to a region immediately outside the image display region DR. Since the distortion tends to become stronger outside the image display region DR, it may incline slightly more than the inclination of the longitudinal line or transverse line in the image display region DR of the vicinity NN. Note that the longitudinal line and the transverse line in the image display region DR of the corrected image IM1 correspond to a longitudinal grid line and a transverse grid line of the initial region PR of the initial image IM0, respectively. In the illustrated example, the amount of inclination of the arrow M3 is approximately equal to the amount of inclination of the longitudinal line or the transverse line in the image display region DR. Note that in the case of character display or the like, when the virtual image IP is corrected such that the distortion is eliminated as in the image display region DR, it is possible to further reduce uncomfortable feeling when the image is viewed.

Note that a size d1 in the x direction, which is a transverse second direction intersecting a first direction, on one end side in the longitudinal y direction, which is the first direction, of a corresponding location of the additional image IM2 distorted by the correction unit 8c may be different from a size d2 in the second direction on another end side in the first direction thereof. The corresponding location of the additional image IM2 is a portion that should be projected in the same size in one pair of patterns MP in the information display, and of which the size is changed according to distortion aberration. Specifically, a transverse width of the upper pattern MP is different from a transverse width of the lower pattern MP. Thus, the image quality of the display having a width in the second direction can be improved in the additional image IM2. For example, when the pattern MP of the information display is an ellipse M4, a rectangle, or the like, a correction of adjusting lengths d1 and d2 of the virtual image IP can be performed.

Hereinafter, image processing for displaying on the display surface 11a of the display element 11 will be described with reference to FIG. 8.

First, in the microprocessor 81 illustrated in FIG. 3, the arithmetic processing device 81a as the first acquisition unit 8a acquires the initial image IM0 that is the first image as the display data from the user terminal 90 via the data communication interface 81c, and stores the initial image IM0 in the storage device 81m (Step S11). The first acquisition unit 8a requests the user terminal circuit 91 of the user terminal 90 for the display data of the initial image IM0 to be displayed on the display element 11. The user terminal circuit 91 operates in response to the above request via the user interface device 91i, outputs the moving image or the still image stored in the storage device 91m to the microprocessor 81 in a predetermined format, or outputs the moving image or the still image acquired via the mobile wireless communication device 91t to the microprocessor 81 in a predetermined format.

Next, in the microprocessor 81, the arithmetic processing device 81a as the correction unit 8c performs distortion correction on the initial image IM0 (Step S12). The correction unit 8c performs various image processing such as coordinate conversion and color and gradation adjustment on the initial image IM0 to cancel the distortion aberration of the optical system, and creates the corrected image IM1.

Next, in the microprocessor 81, the arithmetic processing device 81a as the correction unit 8c sets a background for the outer frame region OR, which has become a region not used for image display by the distortion correction in Step S12 (Step S13). The correction unit 8c defines a range of the outer frame region OR for, for example, the corrected image IM1, and sets the range to display black as a background. This is the corrected image IM1 for synthesis.

Next, in the microprocessor 81, the arithmetic processing device 81a as the second acquisition unit 8b acquires the additional image IM2 that is the second image as the display data from the user terminal 90 via the data communication interface 81c, and stores the additional image IM2 in the storage device 81m (Step S14). Note that the additional image IM2 may be acquired from the display data stored in the storage device 81m of the microprocessor 81.

Next, in the microprocessor 81, the arithmetic processing device 81a as the correction unit 8c performs distortion correction on the additional image IM2 (Step S15). For example, the correction unit 8c corrects the orientation and size of the pattern of the additional information according to the correction result of the corrected image IM1, for example. The additional image IM2 is created to be disposed in the auxiliary regions DN1 to DN5. When the additional image IM2 is disposed within the display image of the corrected image IM1, that is, outside the auxiliary regions DN1 to DN5 due to the distortion correction of the initial image IM0 in Step S12, the correction unit 8c can adjust the arrangement of the additional image IM2 to be disposed in the auxiliary regions DN1 to DN5.

Finally, in the microprocessor 81, the arithmetic processing device 81a as the generation unit 8d synthesizes the corrected image IM1 generated in Step S13 and the additional image IM2 corrected in Step S15, and stores the composite image IM3 that is the generated fourth image in the storage device 81m (Step S16). Thus, the additional image IM2 as additional information is overwritten on the corrected image IM1.

As described above, the fourth image obtained by synthesizing the corrected image IM1 and the additional image IM2 becomes the composite image IM3 illustrated in FIG. 5, and is displayed on the display surface 11a of the display element 11. In the composite image IM3 displayed on the display element 11, a display image IP1 is corrected into a rectangle in the virtual image IP (illustrated in FIG. 6) formed through the imaging optical system 20, and an information display IP2 can be visually recognized on the outside thereof. In the optical systems according to the present embodiment, the virtual image IP is vertically and horizontally reversed relative to the initial image IM0 to create an intermediate image in the middle.

Figure 9:
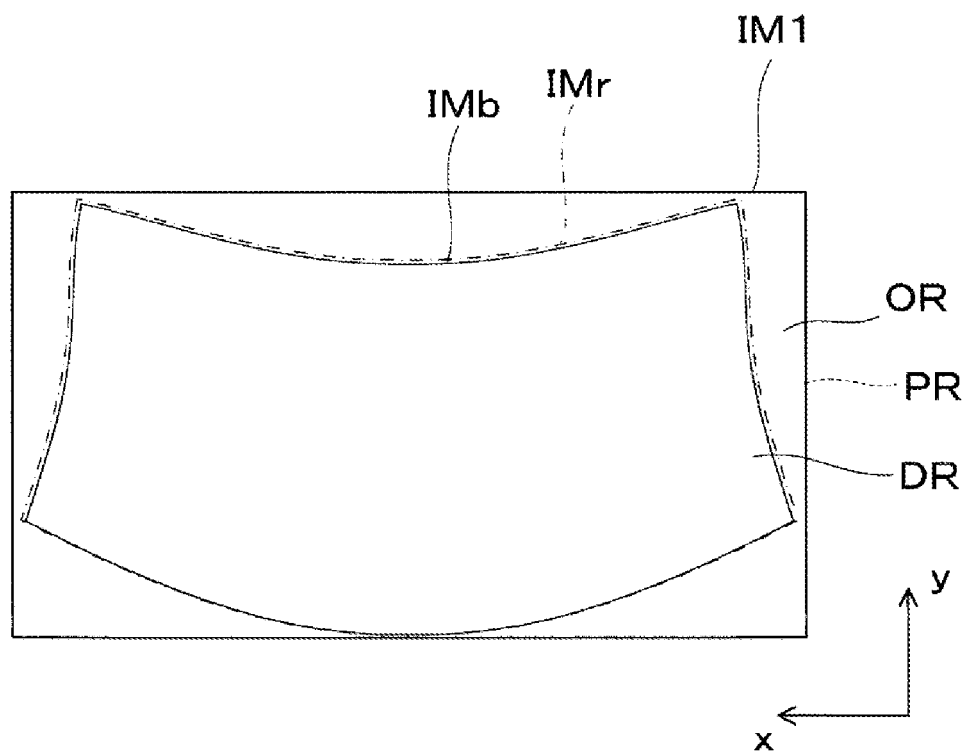
FIG. 9 is a diagram illustrating a modified example of a distorted first image.

Note that as illustrated in FIG. 9, when chromatic aberration is large, the correction unit 8c can cause, in the initial image IM0, an image corresponding to the first wavelength band and an image corresponding to the second wavelength band longer than the first wavelength band to have different magnifications of distortion. At this time, shift adjustment of the image corresponding to the first or second wavelength band may also be performed. The display accuracy of a color image can be improved by changing an amount of correction for each wavelength band. For example, an image corresponding to a red color that is the second wavelength band is projected, as a virtual image, smaller than an image corresponding to a blue color that is the first wavelength band. Thus, in the distorted corrected image IM1, a red corrected display image IMr is formed to be slightly larger than a blue corrected display image IMb, and the red corrected display image IMr is slightly shifted in the longitudinal +y direction from the blue corrected display image IMb. Note that an image corresponding to a green color can also be similarly corrected.

The virtual image display device 100 of the first embodiment described above includes a first acquisition unit 8a that acquires a first image from an information terminal, a second acquisition unit 8b that acquires a second image different from the first image, a correction unit 8c that distorts the first image, a generation unit 8d that generates a third image or a fourth image including the distorted first image and the second image, and a display element 11 that displays the third image or the fourth image.

In the virtual image display device 100, the display element 11 displays the third image or the fourth image including an image obtained by distorting the first image from the information terminal and the second image different from the first image. Thus, it is possible to utilize the region not used in the image from the information terminal and reduce a ratio of the region not used in the display element 11 while the display accuracy of the first image is maintained.

Second Embodiment

Hereinafter, a virtual image display device according to a second embodiment of the present disclosure will be described. Note that the virtual image display device according to the second embodiment is obtained by modifying a part of the virtual image display device according to the first embodiment, and description on common portions will be omitted.

In the present embodiment, in the microprocessor 81, the generation unit 8d generates, as a third image, a composite image including a distorted first image and a second image that is not distorted. In other words, the composite image IM3 is generated without correcting the additional image IM2 illustrated in FIG. 5.

Figure 8:
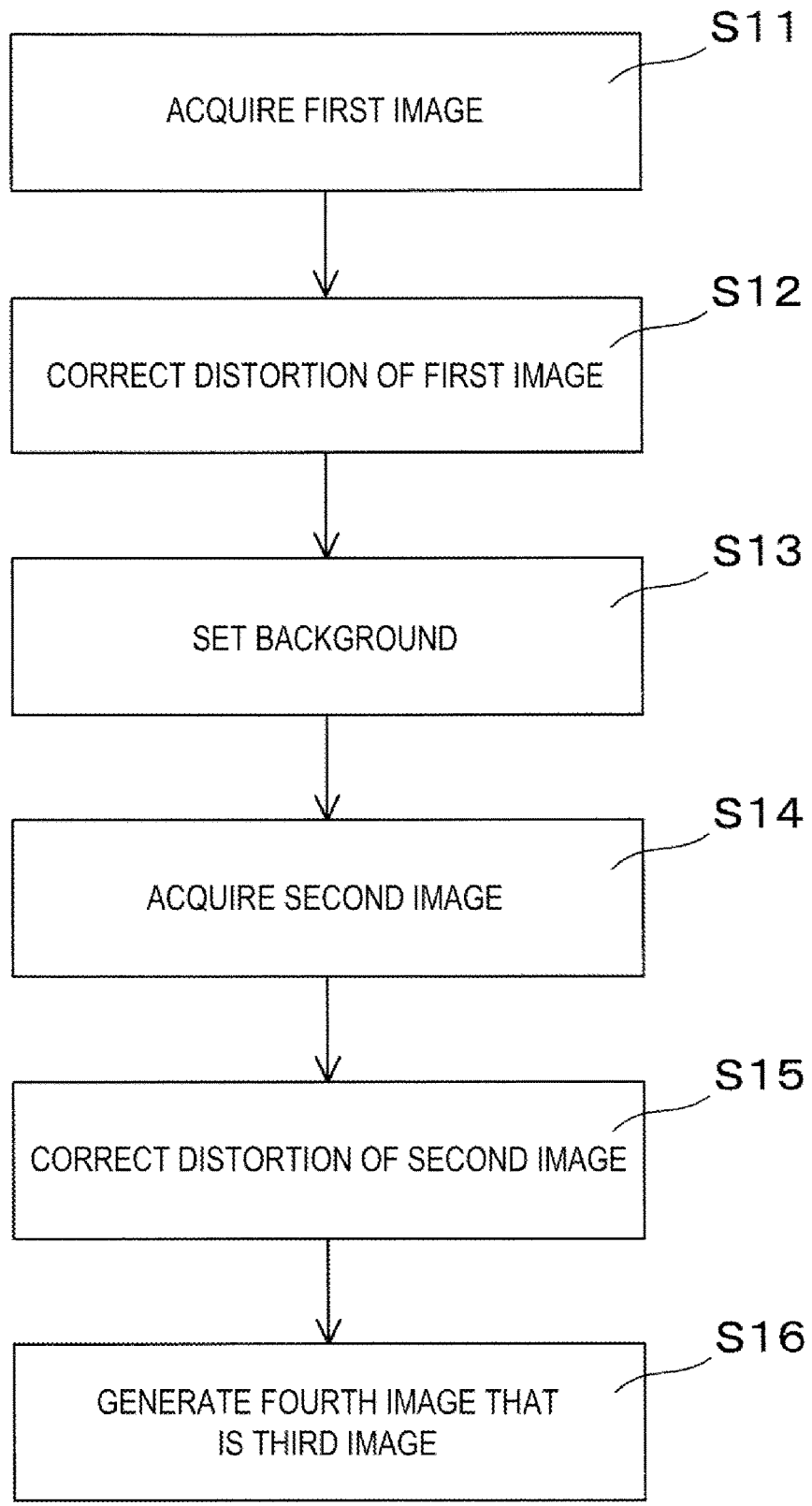
FIG. 8 is a flowchart illustrating image processing in the virtual image display device.
Figure 10:
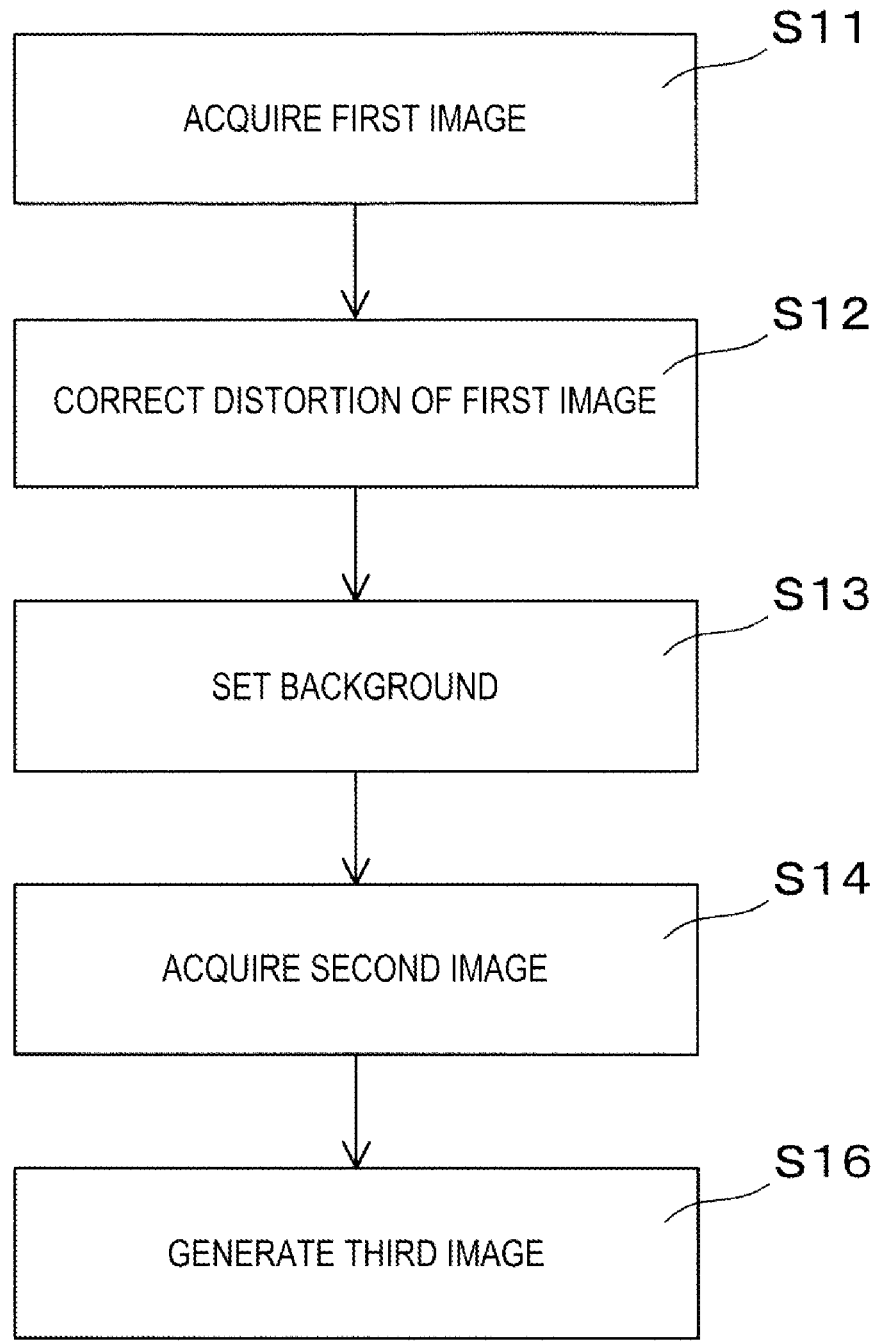
FIG. 10 is a flowchart illustrating image processing in a virtual image display device of a second embodiment.

As illustrated in FIG. 10, for the processing of an image to be displayed on the display surface 11a of the display element 11, the composite image IM3 as the third image is generated in Step S16 without performing the distortion correction in Step S15 illustrated in FIG. 8.

Figure 11:
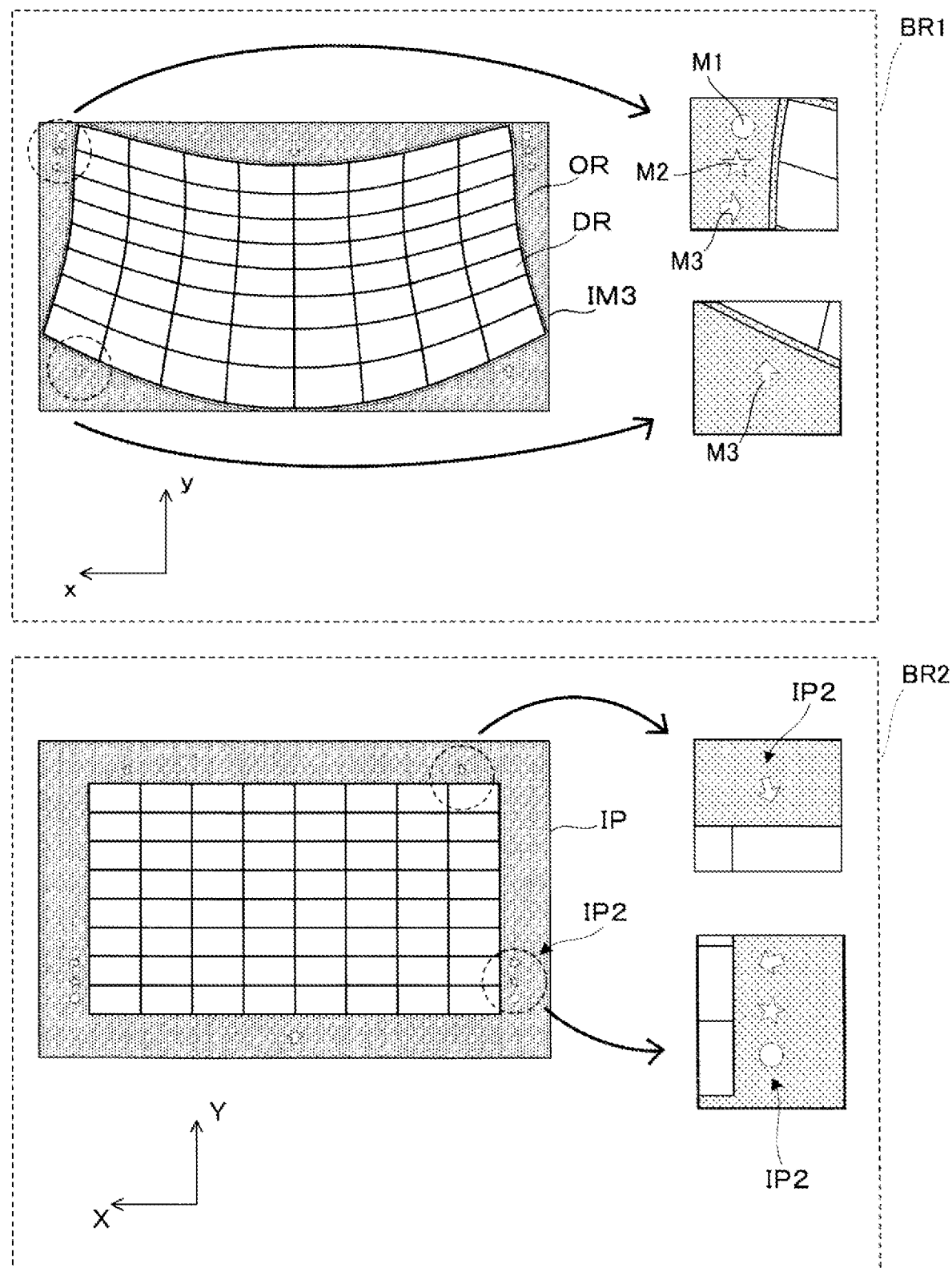
FIG. 11 is a conceptual diagram illustrating a display image of the virtual image display device of the second embodiment and a virtual image corresponding to the display image.

FIG. 11 illustrates an example of the composite image IM3 in which the additional image IM2 is not corrected, and a virtual image IP thereof. In the composite image IM3 of FIG. 11, a pattern of an information display IP2 of the additional image IM2 is displayed, in the virtual image IP, distorted by an amount of distortion of the optical system. The additional image IM2 need not be corrected. Inconvenience may occur in the case of information in which the orientation is important, such as a pattern of an arrow M3. However, when the orientation is not so important, such as a pattern of a circle M1, the impact is small.

Third Embodiment

Hereinafter, a virtual image display device according to a third embodiment of the present disclosure will be described. Note that the virtual image display device according the third embodiment is obtained by modifying a part of the virtual image display device according to the first embodiment, and description on common portions will be omitted.

Figure 12:
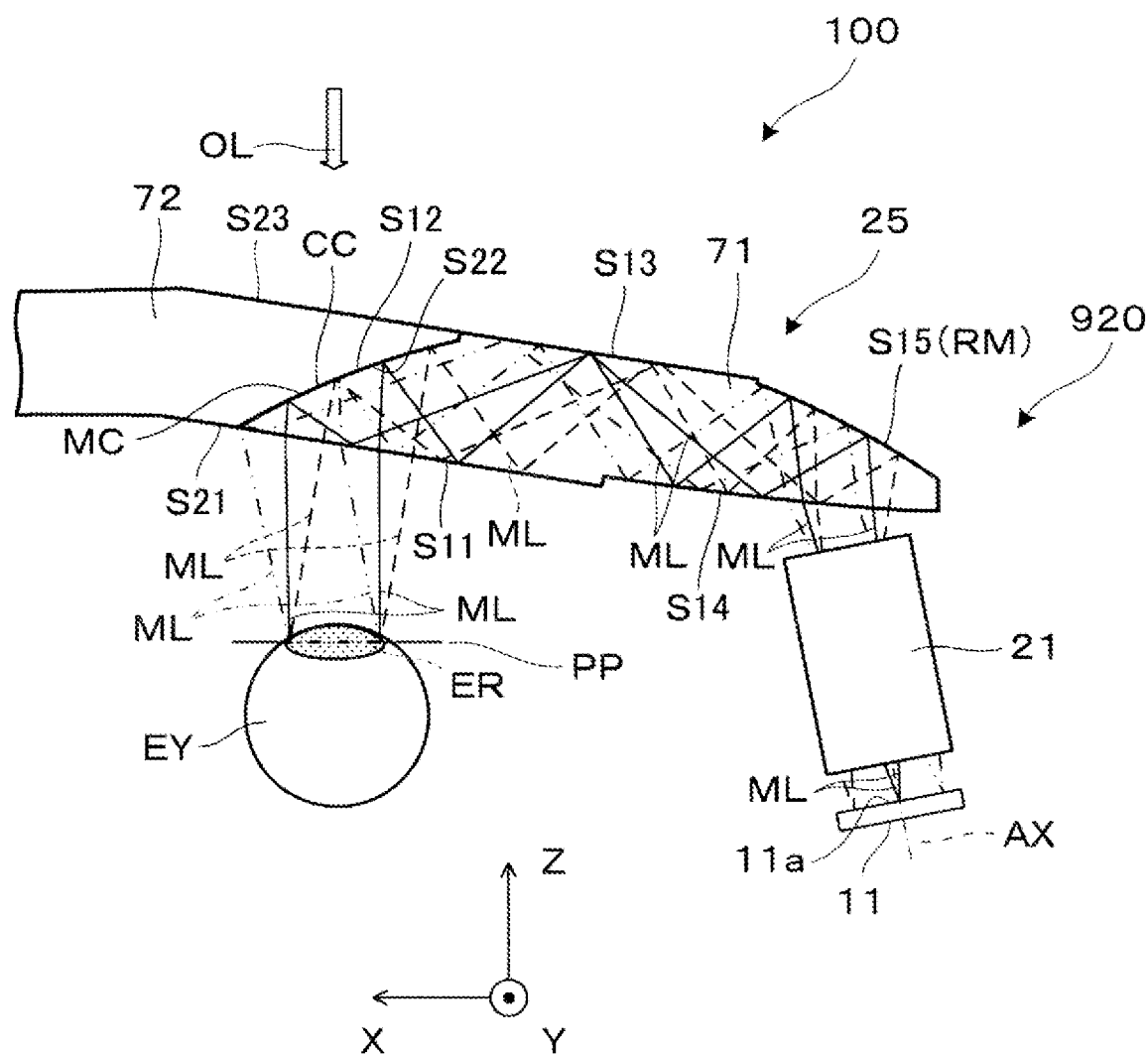
FIG. 12 is a plan view illustrating a virtual image display device according to a third embodiment.

The virtual image display device 100 of the third embodiment will be described with reference to FIG. 12. The virtual image display device 100 includes a display element 11 and an imaging optical system 920. The imaging optical system 920 is an off-axis optical system, but is an optical path that extends in the transverse direction while being reflected, unlike the first embodiment. The imaging optical system 920 is a light guide optical device, and includes a projection lens 21 and a light guide body 25. The light guide body 25 is formed by joining a light guide member 71 and a light transmission member 72 via an adhesive layer CC. The light guide member 71 and the light transmission member 72 are formed of a resin material that exhibits high light-transmissive properties in a visible region. The light guide member 71 has first to fifth surfaces S11 to S15, of which the first and third surfaces S11 and S13 are flat surfaces parallel to each other, and the second, fourth, and fifth surfaces S12, S13, and S15 are convex optical surfaces as a whole and are constituted of freely-curved surfaces, for example. The light transmission member 72 has first to third transmission surfaces S21 to S23, of which the first and third transmission surfaces S21 and S23 are flat surfaces parallel to each other, and the second transmission surface S22 is a concave optical surface as a whole and is constituted of a freely-curved surface, for example. The second surface S12 of the light guide member 71 and the second transmission surface S22 of the light transmission member 72 have an equal shape in which a recess and a protrusion are inverted, and a partial reflection surface MC is formed at a surface of one of them.

An overview of the optical path of the image light ML will be described below. The light guide member 71 guides the image light ML emitted from the projection lens 21 toward the eye of an observer by reflection at the first to fifth surfaces S11 to S15 or the like. Specifically, the image light ML from the projection lens 21 is first incident on the fourth surface S14, is reflected by the fifth surface S15 which is an inner surface of the reflection film RM, is incident again on the fourth surface S14 from the inside and totally reflected, is incident on the third surface S13 and totally reflected, and is incident on the first surface S11 and totally reflected. The image light ML totally reflected by the first surface S11 is incident on the second surface S12, and is partially reflected while partially transmitted through a partial reflection surface MC provided at the second surface S12, and is incident again on the first surface S11 and passes therethrough. The image light ML that has passed through the first surface S11 is incident, as a substantially parallel luminous flux, on a pupil position PP at which the eyes EY of the observer is disposed. In other words, the observer will observe an image by the image light ML as a virtual image.

The light guide body 25 allows the observer to view the image light ML by the light guide member 71, and allows the observer to observe an outside image with little distortion in a state in which the light guide member 71 and the light transmission member 72 are combined. At this time, because the third surface S13 and the first surface S11 are flat surfaces substantially parallel to each other (diopter is approximately 0), aberration or the like is hardly generated for the outside light OL. Additionally, the third transmission surface S23 and the first transmission surface S21 are flat surfaces substantially parallel to each other. Furthermore, because the third transmission surface S23 and the first surface S11 are flat surfaces substantially parallel to each other, little aberration or the like is generated. As described above, the observer observes an outside image without distortion through the light guide member 71 and the light transmission member 72.

In the case of the virtual image display device 100 according to the present embodiment, the imaging optical system 920 that is asymmetric in the transverse direction is included, and thus the distortion correction is asymmetric relative to the transverse direction, that is, the X direction.

Modified Examples and Others

The present disclosure is described according to the above-described embodiments, but the present disclosure is not limited to the above-described embodiments. The present disclosure may be carried out in various modes without departing from the gist of the present disclosure, and, for example, the following modifications may be carried out.

In the above description, the first acquisition unit 8a and the second acquisition unit 8b are provided in the microprocessor 81. However, the first acquisition unit 8a and the second acquisition unit 8b may be provided in the user terminal circuit 91. Additionally, the first acquisition unit 8a, the second acquisition unit 8b, the correction unit 8c, and the generation unit 8d may be provided in the user terminal circuit 91, or the generation of the third image or the fourth image may be performed in the user terminal 90.

In the above description, the imaging optical system 20 is a two-mirror optical system including the prism mirror 22 and the see-through mirror 23. However, the present disclosure can be applied to other optical systems as long as the distortion of the optical system is offset by the display.

Regarding the additional image IM2, when the region used for information display is determined, such as when displaying a specific pattern only at a specific position, the region not used for display may be covered with a light-shielding plate metal. For example, the impact on other regions is eliminated by shielding the region not used in the corrected image IM1 and the additional image IM2. By shielding the region not used in the display image of the corrected image IM1 due to the distortion correction, it is possible to suppress ghost or black floating caused by unnecessary light and improve the image quality.

A light control device that controls light by limiting transmitted light of the see-through mirror 23 may be mounted outside the see-through mirror 23. The light control device adjusts a transmittance, for example, electrically. Mirror liquid crystals, electronic shades, and the like may be used as the light control device. The light control device may adjust a transmittance according to external light brightness.

In the above description, it is assumed that the virtual image display device 100 is mounted and used on a head. However, the virtual image display device 100 described above can also be used as a handheld display that is brought closer to the eyes like binoculars without being mounted on the head. In other words, the head-mounted display also encompasses handheld displays in the present disclosure. Additionally, the virtual image display device 100 can also be used as a head-up display that projects an image onto a windshield of an automobile, for example.

A virtual image display device according to a specific aspect includes a first acquisition unit configured to acquire a first image from an information terminal, a second acquisition unit configured to acquire a second image different from the first image, a correction unit configured to distort the first image, a generation unit configured to generate a third image including the distorted first image and the second image, and a display element configured to display the third image.

In the virtual image display device, the display element displays the third image including an image obtained by distorting the first image from the information terminal and the second image different from the first image. Thus, it is possible to use a region not used in an image from the information terminal and to increase an amount of information presented to an observer while display accuracy of the first image is maintained.

In a specific aspect, the second image is an image including information about the information terminal or the virtual image display device. In this case, information associated with the first image or independent of the first image can be displayed.

In a specific aspect, in the third image, the second image is disposed on an outer side of the distorted first image. In this case, a region not used in the first image can be effectively utilized without interfering with display of the first image.

In a specific aspect, the correction unit distorts the second image, the generation unit generates a fourth image including the distorted first image and the distorted second image, and the display element displays the fourth image. In this case, the display accuracy can also be maintained for the second image, and the image quality of the entire fourth image can be improved.

In a specific aspect, a size in a second direction on one end side in a first direction of a corresponding location of the second image distorted by the correction unit is different from a size in the second direction on another end side in the first direction thereof, the second direction intersecting the first direction. In this case, the image quality of the display having a width in the second direction can be improved in the second image.

In a specific aspect, an optical member on which image light corresponding to the third image or the fourth image is incident, and a reflection member configured to reflect the image light emitted from the optical member toward a pupil are included, and the correction unit corrects the first image by distorting the first image such that distortion caused by the optical member and the reflection member is reversed.

In a specific aspect, the correction unit causes, in the first image, an image corresponding to a first wavelength band and an image corresponding to a second wavelength band longer than the first wavelength band to have different magnifications of distortion. In this case, it is possible to improve display accuracy of a color image by changing an amount of correction for each wavelength band.

In a specific aspect, the second image is an image corresponding to a predetermined wavelength band. In this case, the processing for generating the third or fourth image can be simplified by displaying the second image in a single color.

In a specific aspect, the third image or the fourth image includes a non-display region between the distorted first image and the second image. In this case, pixels corresponding to the first image and pixels corresponding to the second image are separated from each other, and the boundary between the first image and the second image can be clarified.

What is claimed is:

1. A virtual image display device comprising:
   a first acquisition unit configured to acquire a first image from an information terminal;
   a second acquisition unit configured to acquire a second image different from the first image;
   a correction unit configured to distort the first image;
   a generation unit configured to generate a third image including the distorted first image and the second image; and
   a display element configured to display the third image, wherein:
      the correction unit distorts the second image,
      the generation unit generates a fourth image including the distorted first image and the distorted second image,
      the display element displays the fourth image, and
      a size in a second direction on one end side in a first direction of a corresponding location of the second image distorted by the correction unit is different from a size in the second direction on another end side in the first direction thereof, the second direction intersecting the first direction.

2. The virtual image display device according to claim 1, wherein the second image is an image including information about the information terminal or the virtual image display device.

3. The virtual image display device according to claim 1, wherein, in the third image, the second image is disposed on an outer side of the distorted first image.

4. The virtual image display device according to claim 1, further comprising:
   an optical member on which image light corresponding to the third image or the fourth image is incident; and
   a reflection member configured to reflect the image light emitted from the optical member toward a pupil, wherein
   the correction unit corrects the first image by distorting the first image such that distortion caused by the optical member and the reflection member is reversed.

5. The virtual image display device according to claim 1, wherein the correction unit causes, in the first image, an image corresponding to a first wavelength band and an image corresponding to a second wavelength band longer than the first wavelength band to have different magnifications of distortion.

6. The virtual image display device according to claim 5, wherein the second image is an image corresponding to a predetermined wavelength band.

7. The virtual image display device according to claim 1, wherein the third image or the fourth image includes a non-display region between the distorted first image and the second image.

* * * * *